(12) United States Patent
Degiovine (10) Patent No.: US 9,134,763 B2
(45) Date of Patent: Sep. 15, 2015

(54) EXTERNALLY MOUNTED DISPLAY DEVICE

(71) Applicant: SYMBOL TECHNOLOGIES, INC., Schaumburg, IL (US)

(72) Inventor: Carl Degiovine, Shirley, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 179 days.

(21) Appl. No.: 14/076,334

(22) Filed: Nov. 11, 2013

(65) Prior Publication Data

US 2015/0131009 A1     May 14, 2015

(51) Int. Cl.
    *G02F 1/1333*       (2006.01)
    *G06F 1/16*         (2006.01)

(52) U.S. Cl.
    CPC ............................ *G06F 1/1637* (2013.01)

(58) Field of Classification Search
    USPC ........................................................ 349/58
    See application file for complete search history.

(56) References Cited

U.S. PATENT DOCUMENTS

| | | | |
|---|---|---|---|
| 6,365,832 B1 | 4/2002 | Staron et al. | |
| 7,295,260 B2 * | 11/2007 | Harayama et al. | 349/61 |
| 8,405,620 B2 | 3/2013 | Huang | |
| 2002/0101399 A1 * | 8/2002 | Kubo et al. | 345/104 |
| 2009/0244025 A1 | 10/2009 | Hirota | |
| 2011/0050612 A1 | 3/2011 | Matsumoto et al. | |
| 2012/0162891 A1 * | 6/2012 | Tranchina et al. | 361/679.26 |

* cited by examiner

*Primary Examiner* — Lucy Chien (57) ABSTRACT

An electronic device includes a housing and a display device. The housing includes at least one recess. The display device includes a plurality of layers that externally couple to the housing. One of the layers includes at least one tab extending perpendicular to a surface of the display device. The tab is coupled to at least a portion of a perimeter of the recess.

18 Claims, 7 Drawing Sheets

EXTERNALLY MOUNTED DISPLAY DEVICE

BACKGROUND OF THE INVENTION

An electronic device may include a variety of different components. For example, the electronic device may include a display device. The display device may show data to a user. The display device may be coupled to a housing of the electronic device in a variety of manners. In a first example, the housing of the electronic device may include a first portion and a second portion that are coupled together with the various hardware components being disposed wholly within or partially within the housing. The first portion may be a top portion in which the display device is mounted on an interior side of the first portion. The first portion may include a recess for the display device to be exposed to an exterior of the housing such that the data may be viewed. With the display device mounted on the interior side, the first portion of the housing may include flanges that extend over an exterior side of the display device such that the display device is securely housed. However, these flanges decrease an overall surface area in which data may be displayed on the exposed surface of the display device.

In a second example, the housing of the electronic device may include an external mounting such that the display device is externally mounted to the electronic device. Accordingly, the display device has an increased overall surface area in which data may be displayed. When the display device is externally mounted, the display device is taped or glued into place in the external mounting. For example, an interior perimeter of the display device may have the adhesive applied thereto. However, with harsh environmental conditions, other scenarios in which the electronic device may be subject to inadvertent forces, the adhesive losing its integrity, etc., the externally mounted display device may decouple from the housing of the electronic device. For example, the display device may "pop out" of the external mounting.

Accordingly, there is a need to further ruggedize the coupling between the housing of the electronic device and the externally mounted display device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The exemplary embodiments provide an electronic device comprising a housing and a display device. The housing includes at least one recess. The display device includes a plurality of layers that externally couple to the housing. One of the layers includes at least one tab extending perpendicular to a surface of the display device. The recess receives the tab toward an interior of the housing. The tab is coupled to at least a portion of a perimeter of the recess.

The exemplary embodiments may be further understood with reference to the following description and the appended drawings, wherein like elements are referred to with the same reference numerals. The exemplary embodiments describe an externally mounted display device and a manner of coupling the display device to a housing of an electronic device. Specifically, the display device includes a plurality of tabs that are received in recesses of the housing to ruggedize the coupling. The display device, the electronic device with its housing, the external mounting, the tabs, the recesses, and a related method will be discussed in further detail below.

Figure 1:
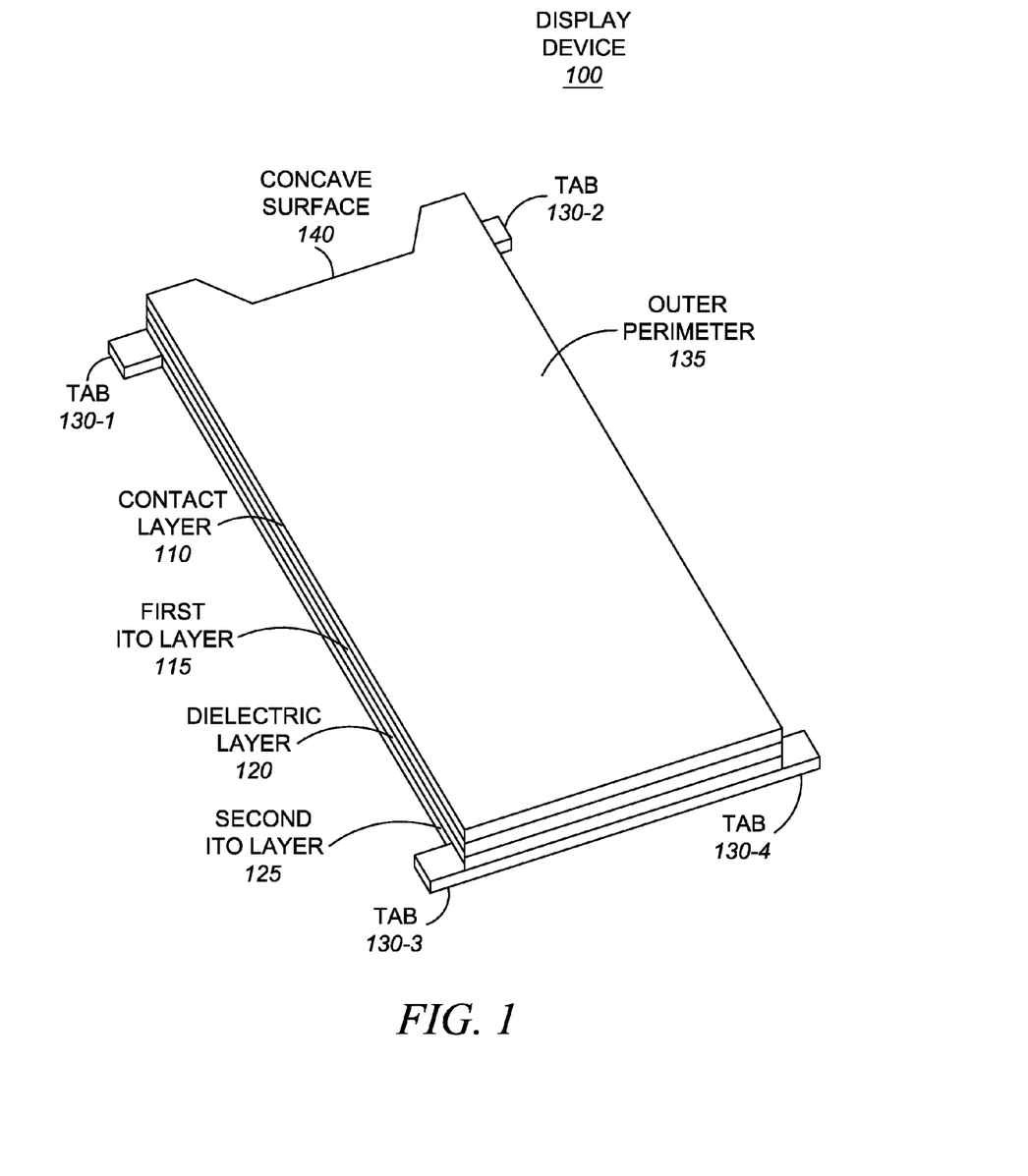
FIG. 1 shows a first view of a display device in accordance with some embodiments.

FIG. 1 shows a first view of a display device 100 in accordance with some embodiments. The display device 100 may be a component that is externally mounted to a housing of an electronic device. The display device 100 may be any component configured to show data to a user. The display device 100 may also incorporate an input device such that the display device 100 may be a touch screen in which a user may enter inputs via a surface of the display device 100. As will be described in further detail below, the display device 100 may have a plurality of tabs 130 that is used to increase the ruggedness from externally mounting the display device 100 to the housing of the electronic device. The display device 100 may be manufactured to have an outer perimeter 135. The outer perimeter 135 may be shaped to correspond to a mounting surface on the housing of the electronic device in which the display device 100 is to be externally mounted. For example, the outer perimeter 135 may have a shape with dimensions that correspond to a mounting surface having an identical shape with equal dimensions. The outer perimeter 135 may include a concave surface 140 to accommodate a component disposed at least partially in the housing of the electronic device. As illustrated, the display device 100 may be a capacitive touch screen including a plurality of layers such as a contact layer 110, a first Indium Tin Oxide (ITO) layer 115, a dielectric layer 120, and a second ITO layer 125. However, as will be described in further detail below, the display device 100 may include any number of layers as well as types of layers dependent upon the type of display device 100. FIG. 1 shows that the contact layer 110 may be a topmost layer relative to a mounting surface of an electronic device on which the display device 100 is mounted (furthest from the mounting surface); the first ITO layer 115 may be directly below the contact layer 110; the dielectric layer 120 may be directly below the ITO layer 115; and the second ITO layer 120 may be directly below the dielectric layer 115 as well as being the bottom-most layer relative to the mounting surface (closest to the mounting surface).

According to a first exemplary embodiment illustrated in FIG. 1 in which the display device 100 is a capacitive touch screen, the display device 100 may be configured to receive touch inputs on the contact layer 110 that may be registered using the first ITO layer 115, the dielectric layer 120, and the second ITO layer 125. It should be noted that the first ITO layer 115 and the second ITO layer 125 may each be an insulator such as glass coated with a transparent conductor such as ITO. That is, the first ITO layer 115 and the second ITO layer 125 may include an ITO film. As the human body is also an electrical conductor, touching the contact layer 100 results in a distortion of the electrostatic field of the touch screen that is measurable as a change in capacitance. Using known technologies, this change in capacitance may be used to determine the location of the touch input such that the location is sent for processing thereof.

According to the first exemplary embodiment in which the display device 100 is a capacitive touch screen, the contact layer 110 may be a display layer that is configured to show the data to the user. The contact layer 110 may be sufficiently flexible such that the subsequent layers (e.g., the first ITO layer 115, the dielectric layer 120, and the second ITO layer 125) disposed beneath the contact layer 110 may receive the touch input. Specifically, the contact layer 110 may be the top-most layer that has a surface that remains exposed to an exterior of the housing of the electronic device. Accordingly, the contact layer 110 may also be the surface in which the user enters the touch inputs. Therefore, the contact layer 110 is configured to translate the touch input received on the surface thereof from the user to the other layers: the ITO layer 115, the dielectric layer 120, and the second ITO layer 125. The first ITO layer 115 may be a first conducting layer while the second ITO layer 125 may be a second conducting layer. The dielectric layer 120 disposed between the first ITO layer 115 and the second ITO layer 125 may an electrical insulator that may be polarized by an applied electric field from the user entering the touch input. It should be noted that the capacitive touch screen may include further layers such as a glass substrate layer in which the contact layer 110, the first ITO layer 115, the dielectric layer 120, and the second ITO layer 120 are disposed thereon. It should also be noted that any known manner of coupling the various layers to each other may be used such as optical bonding.

It should further be noted that the use of the ITO film is only exemplary. Those skilled in the art will understand that the touch panel may also be comprised of other types of films that allow the touch panel to register the touch inputs. For example, the touch panel may be comprised of an Antimony Tin Oxide (ATO) film, a Polyethylene Terephthalate (PET) layer, and the like.

According to a second exemplary embodiment, the display device 100 may be a resistive touch screen (not shown). Specifically, touch inputs may be registered using different types of layers. The resistive touch screen may also include a touch panel comprising several layers. Specifically, the resistive touch screen may include a first thin, transparent electrically-resistive layer which is the top-most relative to a mounting surface of the electronic device (furthest from a mounting surface); a thin space directly under the first electrically-resistive layer; a second thin, transparent electrically-resistive layer directly under the thin space; and a display layer directly under the second electrically-resistive layer which is the bottom-most (closest to the mounting surface).

The first electrically-resistive layer may be the layer that is contacted by the user to enter the touch inputs. Therefore, a first surface of this first electrically-resistive layer may be exposed to an exterior of housing of the electronic device. A second, opposing surface to the first surface of the first electrically-resistive layer may include a coating. The thin space may be an empty space filled with, for example, air. The second electrically-resistive layer may also include a coating. However, this coating on the second electrically-resistive layer may be on a surface that faces the first electrically-resistive layer. In this manner, the two electrically-resistive layers may have operating surfaces (i.e., including the coating) that face each other. It should be noted that the first and second electrically-resistive layers may include a flexible substrate in which the coating is disposed. The first electrically-resistive layer may have conductive connections extending along a first direction while the second electrically-resistive layer may have conductive lines extending along a second direction that is perpendicular to the first direction. A voltage may be applied through these conductive lines. When an object, such as a fingertip or stylus tip, presses down onto the exposed first surface of the first electrically-resistive layer, the conductive lines at the point of contact on the first electrically-resistive layer may touch the conductive lines on the second electrically-resistive layer such that the conductive layers are connected at that point. The touch panel may behave as a pair of voltage dividers, one axis at a time. By rapidly switching between each layer, the position of a pressure on the screen may be read. The display layer may be configured to show the data to the user. With the first and second electrically-resistive layers being transparent and the thin space being filled with air, the user is still capable of viewing the data on the display layer although being the bottom-most.

The display device 100 may include further components such as electrical connectors (not shown). For example, the display layer (dependent on the type of display device 100) may include first electrical connectors that couple to corresponding first electrical connectors of the electronic device to which the display device 100 is coupled. The corresponding first electrical connectors may couple the display device 100 to a processor of the electronic device. In another example, the touch panel (dependent on the type of display device 100) may include second electrical connectors that couple to corresponding second electrical connectors of the electronic device. The corresponding second electrical connectors may relay the touch input that is received on the display device 100 to the processor of the electronic device for further processing.

As the touch panel layer (e.g., the ITO layer 125 for the capacitive touch screen or the first electrically-resistive layer for the resistive touch screen) is manufactured using a flexible film, the touch panel layer may also be manufactured to include the tabs 130. As illustrated in the exemplary embodiment of FIG. 1, the display device 100 may include four tabs 130-1, 130-2, 130-3, and 130-4. The tabs 130 may be manufactured such that the tabs 130 extend parallel to a surface of the display device 100. Thus, an initial position of the tabs 130 may be in this parallel manner. As will be described in further detail below, the tabs 130 may be moved for the external mounting of the display device 100 with the housing of the electronic device.

FIG. 1 shows that each corner of the touch panel (e.g., the second ITO layer 125) of the display device 100 includes a tab 130-1, 130-2, 130-3, 130-4. However, it should be noted that the use of four tabs 130-1, 130-2, 130-3, 130-4 is only exemplary. As will become apparent below, any number of tabs 130 may be used such as a single tab 130 or more than four tabs 130. It should also be noted that the disposition of the tabs 130-1, 130-2, 130-3, 130-4 at the corners is only exemplary. As will also become apparent below, the tabs 130 may be positioned along any side of the touch panel with possibly varying number of tabs on each side. It should further be noted that the rectangular solid shape of the tabs 130 is only exemplary. That is, any shape may be used for the tabs 130. As will be described in further detail below, the tabs 130 may include structural features that enable the tabs 130 to couple to the housing of the electronic device.

It should be noted that the display device 100 may be configured to only show data. That is, the display device 100 may not be configured as a touch screen. The display device 100 may still include a plurality of layers. As discussed above, the display device 100 may have any number of layers. Accordingly, when the display device 100 is only configured to show data, the display device 100 may include a transparent glass substrate layer which is a top-most layer; a display layer directly underneath the glass substrate that shows the data; and a tab layer directly underneath the display layer that includes the tabs 130.

Figure 2:
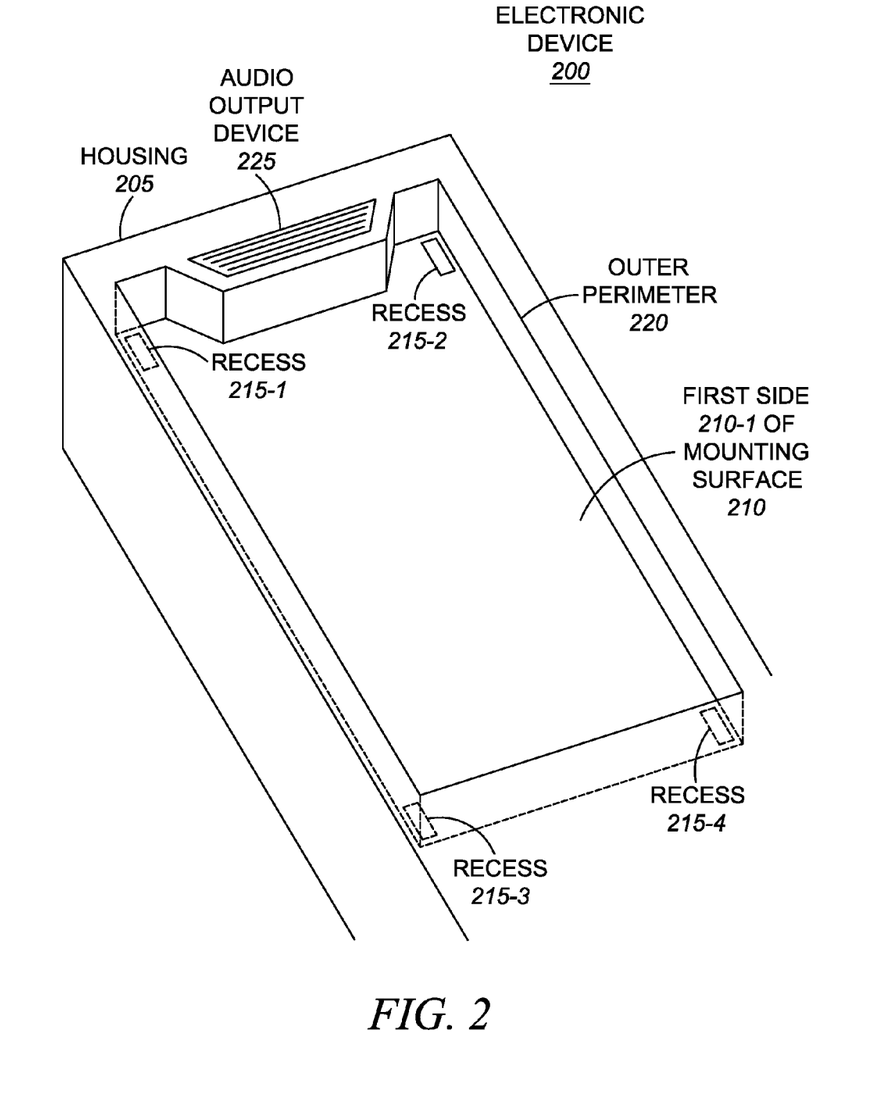
FIG. 2 shows a first view of an electronic device in accordance with some embodiments.

FIG. 2 shows a first view of an electronic device 200 in accordance with some embodiments. The electronic device 200 may be any device that externally mounts the display device 100. For example, the electronic device 100 may be a laptop, a cellular phone, a smartphone, a personal digital assistant, a tablet, an imager (e.g., a barcode scanner), etc. The electronic device 200 may include conventional components such as a processor, a memory arrangement, a transceiver, a portable power supply, etc. As illustrated in FIG. 2, the electronic device 200 may also include an audio output device 225.

As illustrated in FIG. 2, the electronic device 200 may include a housing 205, a mounting surface 210 having an outer perimeter 220, and a plurality of recesses 215-1, 215-2, 215-3, 215-4. The electronic device 200 may include an overall housing arrangement having a top portion and a bottom portion that are coupled together for the components to be disposed wholly or at least partially therein. The top portion of the overall housing arrangement may be the housing 205. The first view of FIG. 2 relates to a view of the housing 205 of the electronic device 200 in which a surface that the display device 100 is ultimately mounted is shown.

The mounting surface 210 shown in FIG. 2 may be for a first side 210-1. Prior to the display device 100 being mounted, the first side 210-1 of the mounting surface 210 may be exposed to an exterior of the housing 205 of the electronic device 200. The first side 210-1 of the mounting surface 210 may be a portion of the housing 205 with a surface on which the display device 100 of FIG. 1 is externally mounted. That is, the display device 100 may be externally received in the housing 205 onto the first side 210-1 of the mounting surface 210. The recesses 215-1, 215-2, 215-3, 215-4 may be apertures on the mounting surface 210 that extend therethrough. As will be described in further detail below, the recesses 215-1, 215-2, 215-3, 215-4 may receive the tabs 130-1, 130-2, 130-3, 130-4, respectively, of the display device 100. Accordingly, a position of the recesses 215-1, 215-2, 215-3, 215-4 corresponds to the position of the tabs 130-1, 130-2, 130-3, 130-4, respectively, on the touch panel of the display device 100.

As the display device 100 is externally received in the housing 205 onto the first side 210-1 of the mounting surface 210, the outer perimeter 220 of the electronic device 200 may correspond to the outer perimeter 135 of the display device 100. Furthermore, as discussed above, to accommodate the shape of the outer perimeter 220 of the electronic device 200, the outer perimeter 135 of the display device 100 may include corresponding components such as the concave surface 140. For example, the audio output component 225 extends into the recess of the mounting surface 210. Accordingly, the concave surface 140 has a corresponding shape such that the display device 100 may be properly received onto the mounting surface 210.

Figure 3:
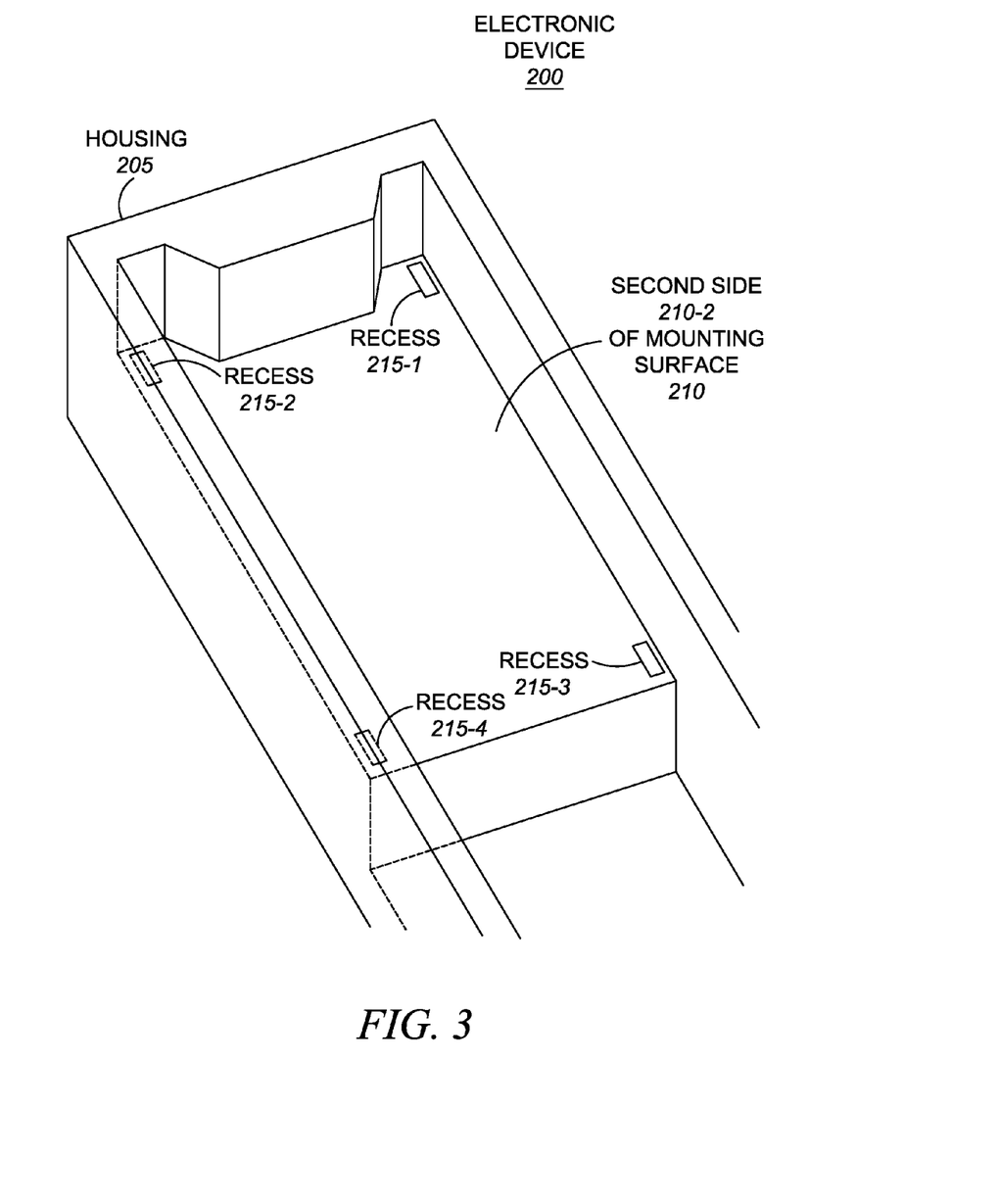
FIG. 3 shows a second view of the electronic device of FIG. 2 in accordance with some embodiments.

FIG. 3 shows a second view of the electronic device 200 of FIG. 2 in accordance with some embodiments. The second view of FIG. 3 shows a bottom view of the housing 205 of the electronic device 200. That is, an interior side of the housing 205 is shown in the second view. As shown in FIG. 3, a second side 210-2 of the mounting surface 210 also has the recesses 215-1, 215-2, 215-3, 215-4. The second side 210-2 of the mounting surface 210 may be an opposite side with respect to the first side 210-1 of the mounting surface 210. As apertures, the recesses 215-1, 215-2, 215-3, 215-4 extend through the mounting surface 210 as shown in FIGS. 2 and 3. That is, the recesses 215-1, 215-2, 215-3, 215-4 extend from the first side 210-1 of the mounting surface 210 to the second side 210-2 of the mounting surface 210.

Figure 4:
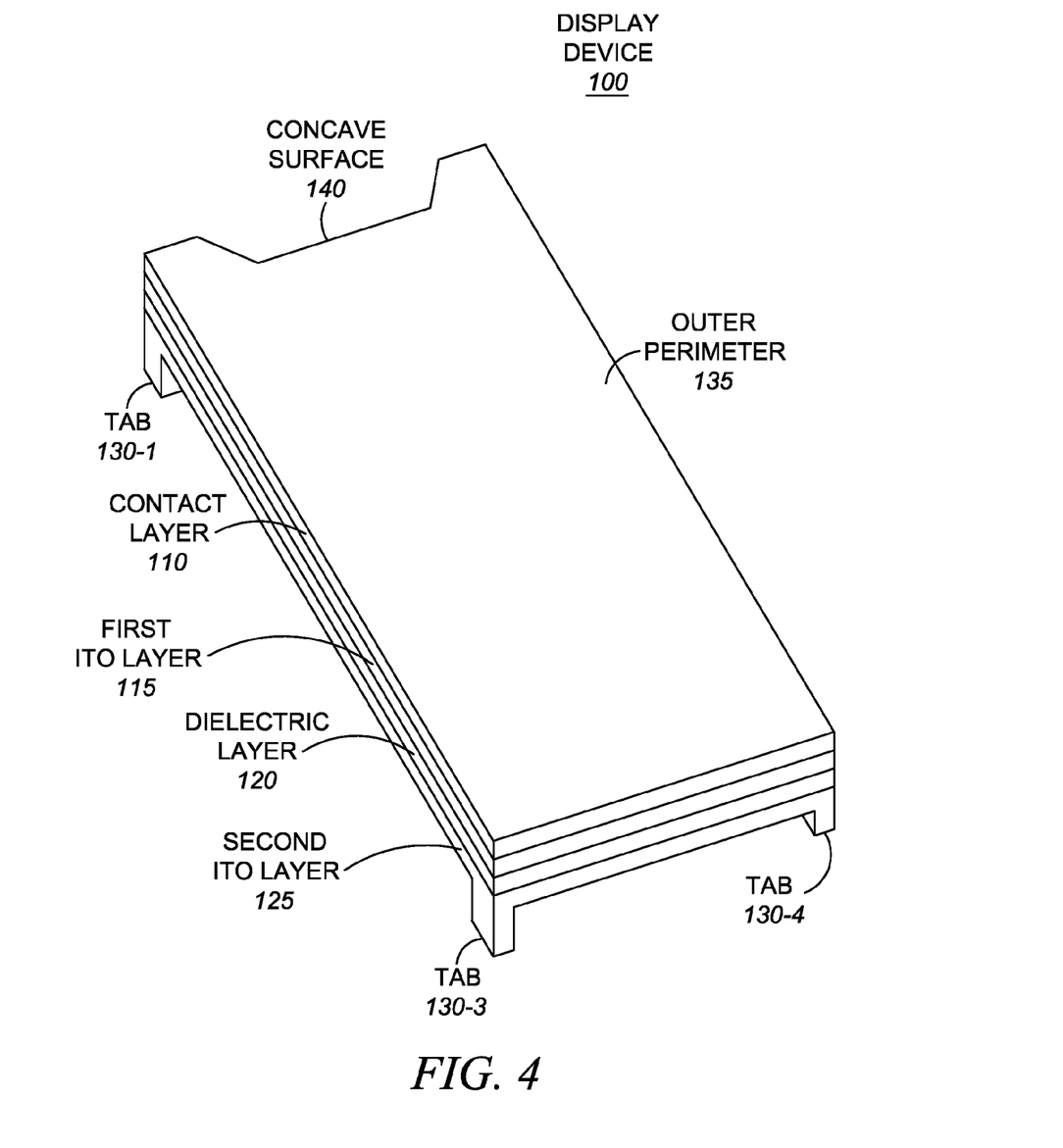
FIG. 4 shows a second view of the display device of FIG. 1 in accordance with some embodiments.

FIG. 4 shows a second view of the display device 100 of FIG. 1 in accordance with some embodiments. In the second view of FIG. 4, the display device 100 is prepared to be externally mounted with the housing 205 of the electronic device 200. Specifically, the tabs 130-1, 130-2, 130-3, 130-4 are illustrated as moved to a perpendicular position with respect to the surface of the display device 100. As described above, the tabs 130-1, 130-2, 130-3, 130-4 may be extensions of the touch panel (e.g., the second ITO layer 125). Since the touch panel is manufactured using a flexible material, the tabs 130-1, 130-2, 130-3, 130-4 may be moved from the parallel position to this perpendicular position. It should be noted that the tabs 130-1, 130-2, 130-3, 130-4 may remain flexible or may be configured to maintain a particular position. For example, the tabs 130-1, 130-2, 130-3, 130-4 may be flexible such that the tabs 130-1, 130-2, 130-3, 130-4 are biased toward the parallel or perpendicular position. In another example, a joint at which the tabs 130-1, 130-2, 130-3, 130-4 extend from the second ITO layer 125 may be configured such that a desired angle is maintained.

Once the tabs 130-1, 130-2, 130-3, 130-4 have been moved to the perpendicular position, the display device 100 may be externally mounted onto the first side 210-1 of the mounting surface 210 by being received in the housing 205 of the electronic device 200. Specifically, the movement of the tabs 130-1, 130-2, 130-3, 130-4 into the perpendicular position may provide a flush surface to exist. That is, the outer perimeter 135 may extend along each layer of the display device 100. Accordingly, the outer perimeter 135 may conform to the recess of the housing 205 and the mounting surface 210. In this manner, the display device 100 may be received. That is, the display device 100 may be externally mounted from aligning the outer perimeter 135 with the outer perimeter 220 and moving the display device toward the mounting surface 210. When the display device 100 has been received in the housing 205 and onto the mounting surface 210, the tabs 130-1, 130-2, 130-3, 130-4 may also be received in the recesses 215-1, 215-2, 215-3, 215-4, respectively, which have corresponding positions on the mounting surface 210.

Figure 5:
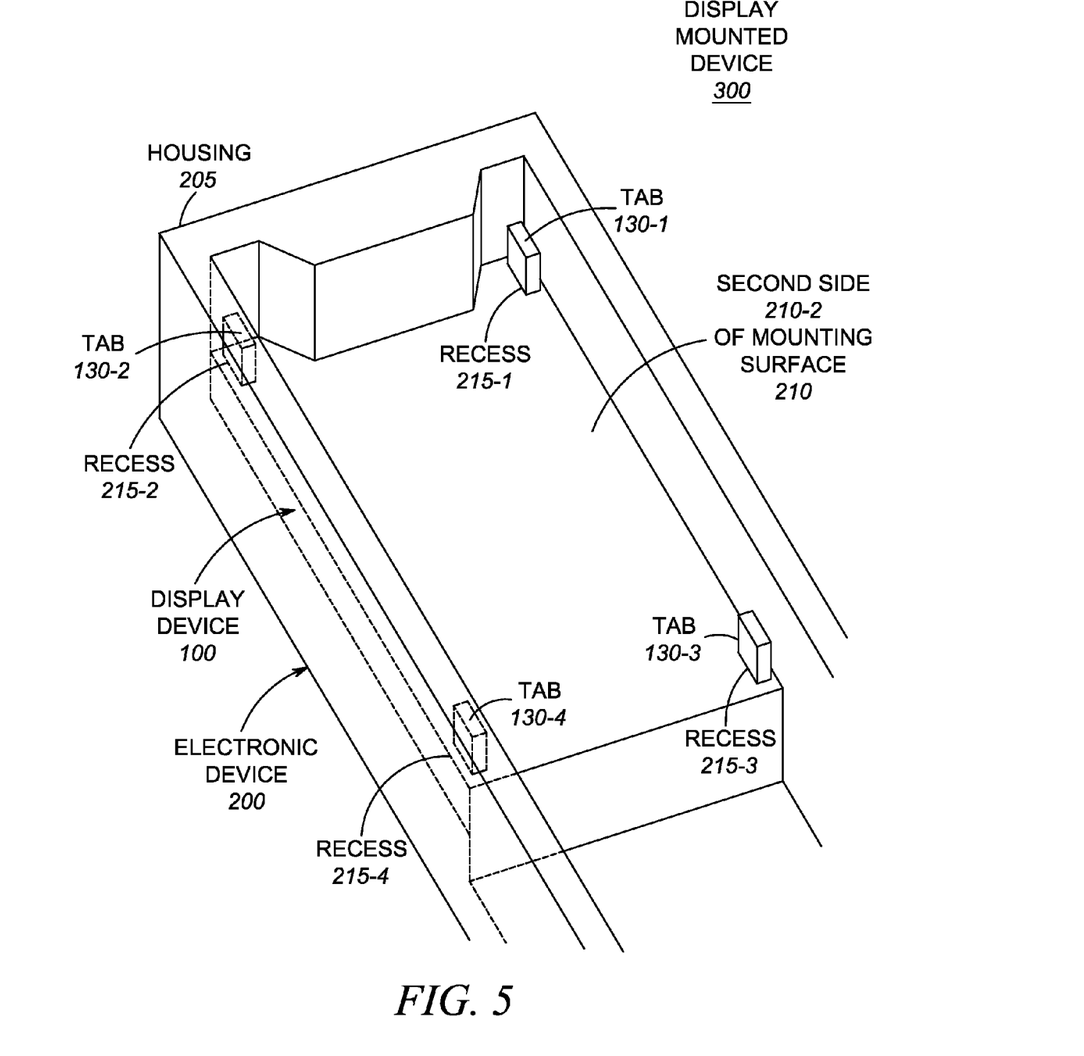
FIG. 5 shows a first view of a display mounted device including the display device of FIG. 4 and the electronic device of FIG. 3 in accordance with some embodiments.

FIG. 5 shows a first view of a display mounted device 300 in accordance with some embodiments. The first view of the display mounted device 300 corresponds to the second view of the electronic device 200 of FIG. 3 after the display device 100 of FIG. 4 has been received. Specifically, this view of FIG. 5 shows the tabs 130-1, 130-2, 130-3, 130-4 being received in the recesses 215-1, 215-2, 215-3, 215-4, respectively. As shown, the tabs 130-1, 130-2, 130-3, 130-4 are received such that they extend through the recesses 215-1, 215-2, 215-3, 215-4, respectively, toward an interior of the housing 205.

Figure 6:
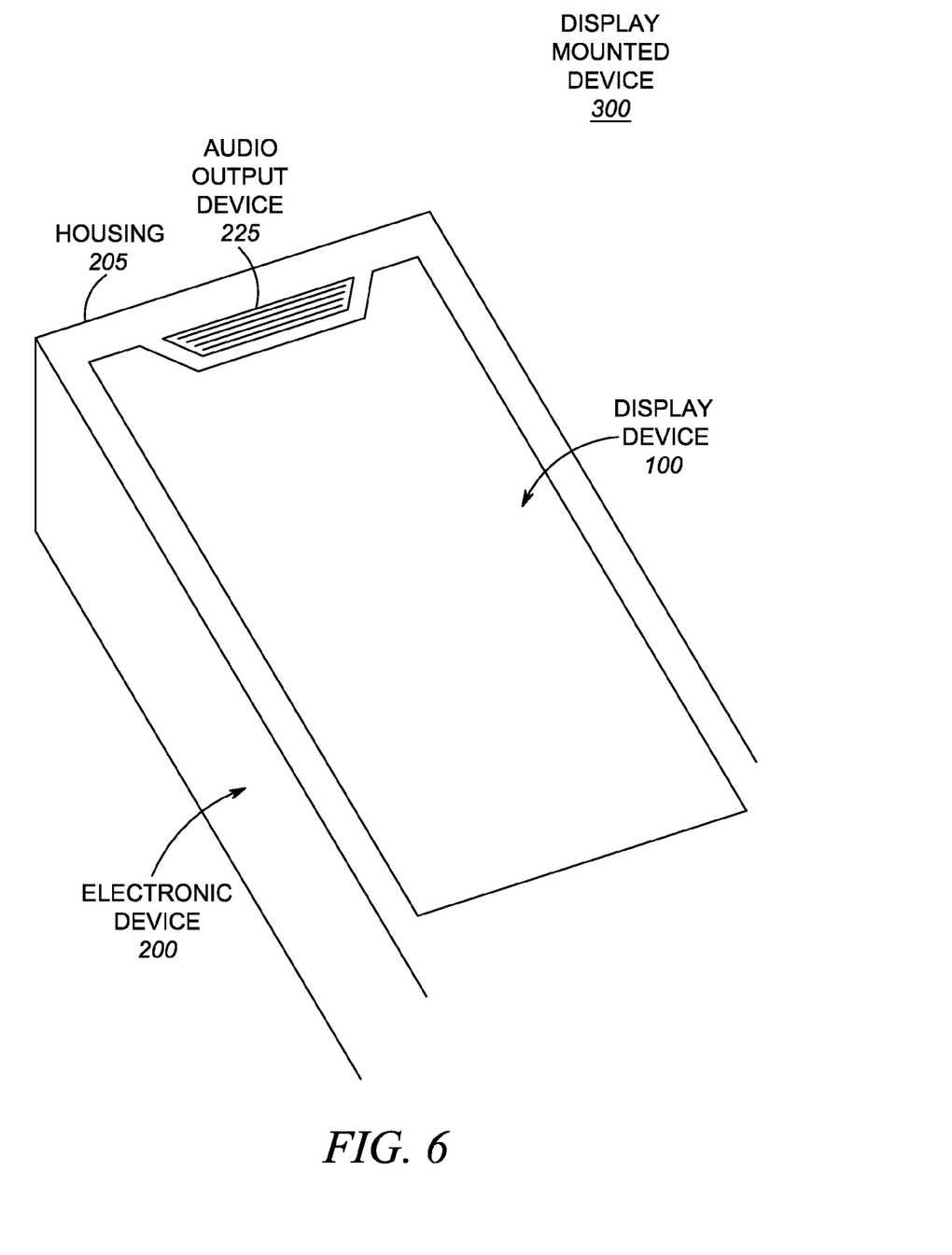
FIG. 6 shows a second view of the display mounted device of FIG. 5 in accordance with some embodiments.

FIG. 6 shows a second view of the display mounted device of FIG. 5 in accordance with some embodiments. The second view of the display mounted device 300 corresponds to the first view of the electronic device 200 of FIG. 2 after the display device 100 of FIG. 4 has been received. Specifically, this view of FIG. 6 shows the display device 100 being externally mounted in the housing 205 of the electronic device 200. As shown, the outer perimeter 135 of the display device 100 corresponds to the outer perimeter 210 of the housing 205 of the electronic device 200. For example, the left side, the right side, and the bottom side of the display device 100 are straight edges that correspond to the left side, the right side, and the bottom side of the mounting surface 210 of the housing 205 of the electronic device 200. Furthermore, the concave surface 140 of the outer perimeter 135 is shaped to accommodate the audio output component 225.

The display device 100 may be externally mounted to the electronic device 200 and retained therein using a variety of manners, particularly regarding the tabs 130 and the recesses 215. Initially, the display device 100 may be externally mounted to the housing 205 using known manners such as an adhesive or tape around select portions (e.g., an inner perimeter) of the ITO layer 125. Thus, an exposed side of the ITO layer 125 may be attached to the mounting surface 210. Furthermore, the tabs 130-1, 130-2, 130-3, 130-4 may be received in the recesses 215-1, 215-2, 215-3, 215-4, respectively, to increase the ruggedness of this external mounting.

In a first manner of coupling the tabs 130-1, 130-2, 130-3, 130-4 to the recesses 215-1, 215-2, 215-3, 215-4, respectively, an adhesive may be used such that the tabs 130-1, 130-2, 130-3, 130-4 are coupled to a perimeter of the respective recesses 215-1, 215-2, 215-3, 215-4. For example, the adhesive may be applied on the longer sides of each of the tabs 130-1, 130-2, 130-3, 130-4 for a portion of the perimeter of the respective recesses 215-1, 215-2, 215-3, 215-4 to be coupled. In another example, the adhesive may be applied around an entire perimeter of each of the tabs 130-1, 130-2, 130-3, 130-4 for the entire perimeter of the respective recesses 215-1, 215-2, 215-3, 215-4 to be coupled. Other adhesives or adhesive carrying surfaces (e.g., tape) may be used in this manner. The use of the adhesive may allow each of the tabs 130-1, 130-2, 130-3, 130-4 to be permanently coupled to the perimeter of the respective recesses 215-1, 215-2, 215-3, 215-4. That is, the tabs 130-1, 130-2, 130-3, 130-4 are prevented or can not be removed from the respective recesses 215-1, 215-2, 215-3, 215-4.

In a second manner of coupling the tabs 130-1, 130-2, 130-3, 130-4 to the recesses 215-1, 215-2, 215-3, 215-4, respectively, each of the tabs 130-1, 130-2, 130-3, 130-4 may be manufactured with a material that allows for a weld to be used such as a heat weld, an ultrasonic weld, etc. Each of the tabs 130-1, 130-2, 130-3, 130-4 may be received in the respective recesses 215-1, 215-2, 215-3, 215-4 and the weld may be used to couple the tabs 130-1, 130-2, 130-3, 130-4 to the respective recesses 215-1, 215-2, 215-3, 215-4. Again, the use of the weld may allow each of the tabs 130-1, 130-2, 130-3, 130-4 to be permanently coupled to the respective recesses 215-1, 215-2, 215-3, 215-4 such that the tabs 130-1, 130-2, 130-3, 130-4 are prevented or can not be removed from the respective recesses 215-1, 215-2, 215-3, 215-4.

In a third manner of coupling the tabs 130-1, 130-2, 130-3, 130-4 to the recesses 215-1, 215-2, 215-3, 215-4, respectively, the tabs 130-1, 130-2, 130-3, 130-4 and the recesses 215-1, 215-2, 215-3, 215-4 may utilize a locking mechanism. As discussed above, the tabs 130-1, 130-2, 130-3, 130-4 may include a shape or extension that provides a first part of the locking mechanism. The recesses 215-1, 215-2, 215-3, 215-4 may include a corresponding second part of the locking mechanism. For example, the tabs 130-1, 130-2, 130-3, 130-4 may include a concave surface along a side that receives a convex surface extending along the respective recesses 215-1, 215-2, 215-3, 215-4. The flexible nature of the tabs 130-1, 130-2, 130-3, 130-4 may enable a temporary deformation along its length to be received through the respective recesses 215-1, 215-2, 215-3, 215-4. When the tabs 130-1, 130-2, 130-3, 130-4 are received in the respective recesses 215-1, 215-2, 215-3, 215-4, the concave surface of the tabs 130-1, 130-2, 130-3, 130-4 may receive the respective convex surface of the recesses 215-1, 215-2, 215-3, 215-4. Other locking mechanism may also be utilized in a substantially similar manner.

In a fourth manner of coupling the tabs 130-1, 130-2, 130-3, 130-4 to the recesses 215-1, 215-2, 215-3, 215-4, respectively, any combination of coupling manners described above may be used to further secure the tabs 130-1, 130-2, 130-3, 130-4 in the respective recesses 215-1, 215-2, 215-3, 215-4. For example, the tabs 130-1, 130-2, 130-3, 130-4 and the recesses 215-1, 215-2, 215-3, 215-4 may include the locking mechanism and an adhesive may subsequently be used.

Figure 7:
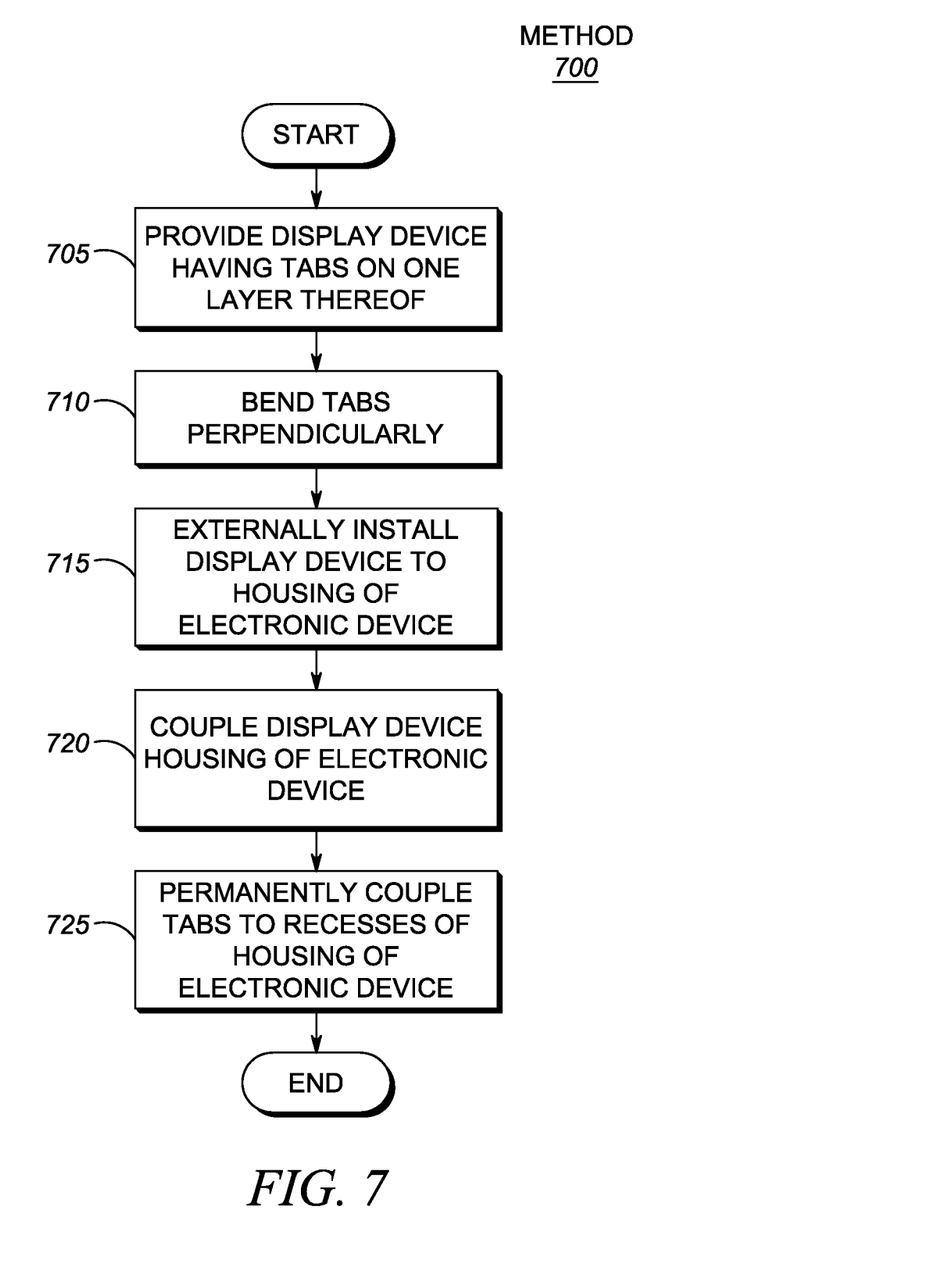
FIG. 7 shows a method of coupling the display device of FIG. 1 to the electronic device of FIG. 2 in accordance with some embodiments.

FIG. 7 shows a method 700 of coupling the display device 100 of FIG. 1 to the electronic device 200 of FIG. 2 in accordance with some embodiments. In step 705, the display device 100 is provided. Specifically, the display device 100 includes a plurality of layers, one of which is a touch panel made of a flexible material and including at least one tab extending substantially parallel to the surface of the display device 100. In step 710, the display device 100 is prepared by bending the tabs 130-1, 130-2, 130-3, 130-4 from the parallel position (shown in FIG. 1) to the perpendicular position (shown in FIG. 4). In step 715, the display device 100 is externally installed to the housing 205 of the electronic device 200. Specifically, the second ITO layer 125 is placed upon the first side 210-1 of the mounting surface 210 and the tabs 130-1, 130-2, 130-3, 130-4 are received in the respective recesses 215-1, 215-2, 215-3, 215-4. In step 720, the display device 100 is coupled to the housing 205 of the electronic device 200. As discussed above, an initial coupling may include using known manners of externally coupling the display device 100 to the housing 205 such as an adhesive applied to an exposed side of the fourth layer 125. In step 725, the tabs 130 are coupled to the recesses 215. As discussed above, this coupling may be achieved through an adhesive, a weld, a locking mechanism, or a combination thereof. Furthermore, the coupling may be permanent such that the tab 130 is prevented or can not be removed from the respective recess 215.

The exemplary embodiments provide an externally mounted display device that is received in a housing of an electronic device. The display device may be a touch screen that includes a plurality of layers. The touch panel layer may include at least one tab extending parallel to the surface of the display device. When the tabs are moved from the parallel orientation to a perpendicular orientation relative to the surface of the display device, the display device may be externally installed to the housing of the electronic device such that the tabs are received in corresponding recesses of the housing of the electronic device. An initial coupling using an adhesive may be used. The tabs may be coupled to the recesses of the housing using a variety of manners. In this way, the externally mounted display device may have a more rugged coupling to the housing of the electronic device. Accordingly, inadvertent forces that are applied to the electronic device that would otherwise cause the display device to decouple from the housing of the electronic device are prevented from doing so.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. An electronic device, comprising:
a housing including at least one recess; and
a display device including a plurality of layers, one of the layers including at least one tab extending perpendicular to a surface of the display device, the layers externally coupling to the housing, the recess receiving the tab toward an interior of the housing, the at least one tab being coupled to at least a portion of a perimeter of the recess, wherein the at least one tab is movable from a first position to a second position, wherein the at least one tab extends parallel to the surface of the display device in the first position and the at least one tab extends in the perpendicular manner in the second position.

2. The electronic device of claim 1, wherein the layer including the at least one tab is a touch panel receiving a touch input.

3. The electronic device of claim 2, wherein the touch panel is a capacitive touch panel, the capacitive touch panel being a bottom layer of the layers.

4. The electronic device of claim 2, wherein the touch panel is a resistive touch panel, the resistive touch panel being a top layer of the layers.

5. The electronic device of claim 2, wherein a further one of the layers is a display layer displaying data to a user.

6. The electronic device of claim 2, wherein the touch panel is one of an Indium Tin Oxide (ITO) film, an Antimony Tin Oxide (ATO) film, and a Polyethelene Terephthalate (PET) layer.

7. The electronic device of claim 1, wherein the at least one tab is coupled to the at least the portion of the perimeter of the recess using one or more of an adhesive, a weld, and a locking mechanism.

8. The electronic device of claim 1, wherein the display device includes an interior surface coupled to a mounting of the housing.

9. The electronic device of claim 1, wherein the at least one tab is coupled to an entirety of the perimeter of the recess.

10. A method of externally mounting a display device to an electronic device, comprising:
providing the display device, the display device including a plurality of layers, one of the layers including at least one tab, the at least one tab extending perpendicular to a surface of the display device;
moving the at least one tab from a first position to a second position, the at least one tab extending parallel to the surface of the display device in the first position, and the at least one tab extending in the perpendicular manner in the second position;
externally coupling the layers to a housing of the electronic device including at least one recess, the recess receiving the at least one tab toward an interior of the housing; and
coupling the at least one tab to at least a portion of a perimeter of the recess.

11. The method of claim 10, wherein the layer including the at least one tab is a touch panel receiving a touch input.

12. The method of claim 11, wherein the touch panel is a resistive touch panel, the resistive touch panel being a top layer of the layers.

13. The method of claim 11, wherein the touch panel is a capacitive touch panel, the capacitive touch panel being a bottom layer of the layers.

14. The method of claim 11, wherein a further one of the layers is a display layer displaying data to a user.

15. The method of claim 11, wherein the touch panel is one of an Indium Tin Oxide (ITO) film, an Antimony Tin Oxide (ATO) film, and a Polyethelene Terephthalate (PET) layer.

16. The method of claim 10, wherein the at least one tab is coupled to the at least the portion of the perimeter of the recess using one or more of an adhesive, a weld, and a locking mechanism.

17. The method of claim 10, further comprising:
coupling an interior surface of the display device to a mounting of the housing.

18. A display device, comprising:
a first layer displaying data to a user; and
a second layer being a touch panel receiving a touch input, the second layer including at least one tab extending perpendicular to a surface of the display device, wherein the at least one tab is movable from a first position to a second position, wherein the tab at least one extends parallel to the surface of the display device in the first position and the at least one tab extends in the perpendicular manner in the second position, the layers externally coupling to a housing of an electronic device, a recess of the housing receiving the at least one tab toward an interior of the housing, the at least one tab being coupled to at least a portion of a perimeter of the recess.

* * * * *